(12) United States Patent
Grabowski et al.

(10) Patent No.: US 6,883,834 B2
(45) Date of Patent: Apr. 26, 2005

(54) METHOD OF AND AN APPARATUS FOR PRESENTING A SEAT BELT BUCKLE

(75) Inventors: Richard M. Grabowski, The Villages, FL (US); Albert R. Bernat, Rochesters Hills, MI (US)

(73) Assignee: Takata Seat Belts, Inc., Auburn Hills, MI (US)

( * ) Notice: Subject to any disclaimer, the term of this patent is extended or adjusted under 35 U.S.C. 154(b) by 64 days.

(21) Appl. No.: 10/352,812

(22) Filed: Jan. 28, 2003

(65) Prior Publication Data

US 2003/0200019 A1 Oct. 23, 2003

Related U.S. Application Data

(63) Continuation of application No. PCT/US01/41509, filed on Aug. 1, 2001.
(60) Provisional application No. 60/222,062, filed on Aug. 1, 2000.

(51) Int. Cl.[7] .............................................. B60R 22/03
(52) U.S. Cl. ..................... 280/801.2; 280/802; 297/481
(58) Field of Search ......................... 280/801.1, 801.2, 280/802, 808; 297/468, 481, 483, 485, 476, 479

(56) References Cited

U.S. PATENT DOCUMENTS

| 4,432,566 A | | 2/1984 | Andres et al. | |
|---|---|---|---|---|
| 5,054,574 A | * | 10/1991 | Scroggie et al. | ............ 180/268 |
| 5,123,673 A | | 6/1992 | Tame | |
| 5,346,256 A | * | 9/1994 | Wiesler et al. | .............. 280/802 |
| 5,431,446 A | | 7/1995 | Czarnecki et al. | |
| 5,538,283 A | | 7/1996 | Townsend | |
| 5,879,027 A | | 3/1999 | Wier | |
| 6,308,986 B1 | * | 10/2001 | Townsend et al. | .......... 280/807 |

FOREIGN PATENT DOCUMENTS

GB             2 235 362 A          3/1991

* cited by examiner

*Primary Examiner*—David R. Dunn
(74) *Attorney, Agent, or Firm*—Fitch, Even, Tabin & Flannery

(57) ABSTRACT

A buckle presenter system is provided that shifts the buckle to a more accessible latching position for latching with a tongue plate or tip and then shifts the latched buckle to a performance position for achieving the desired performance. This is achieved by sensing the occupant's need for latching the buckle as when the occupant enters the vehicle and is seated and then automatically shifting the buckle to a latching position for providing better accessibility for inserting the latch plate into the buckle and then automatically returning the latched buckle to the performance position.

25 Claims, 5 Drawing Sheets

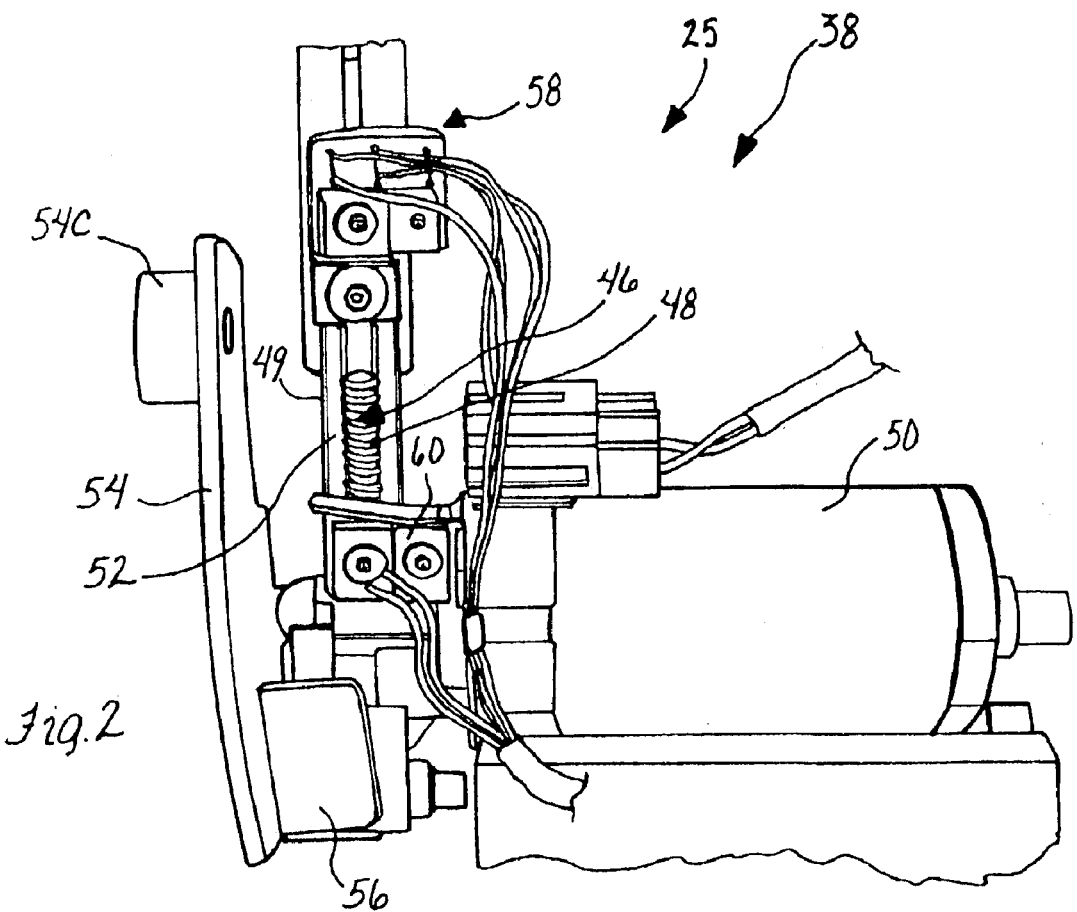
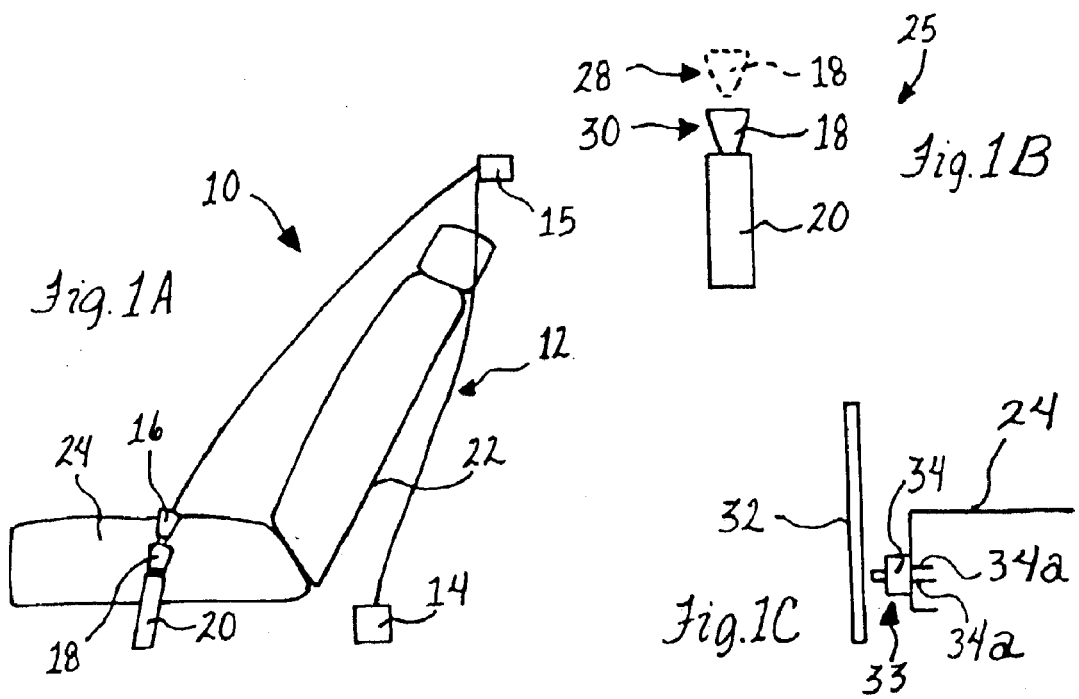

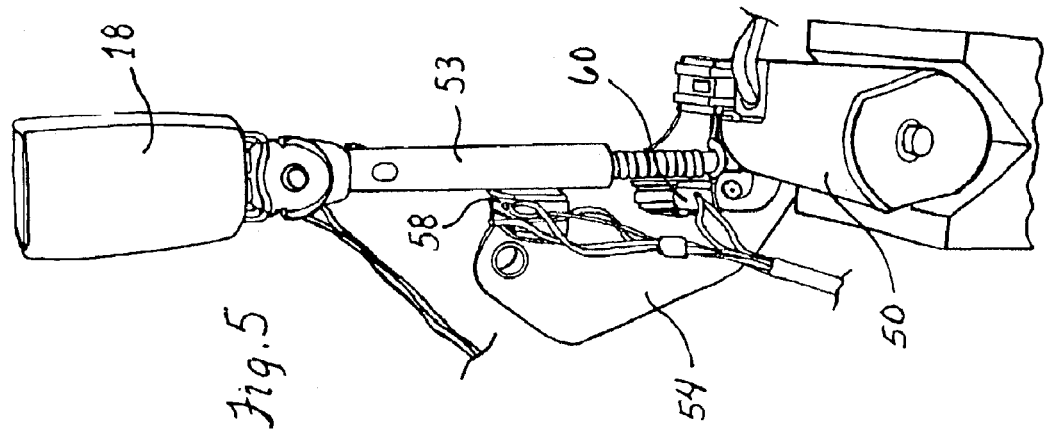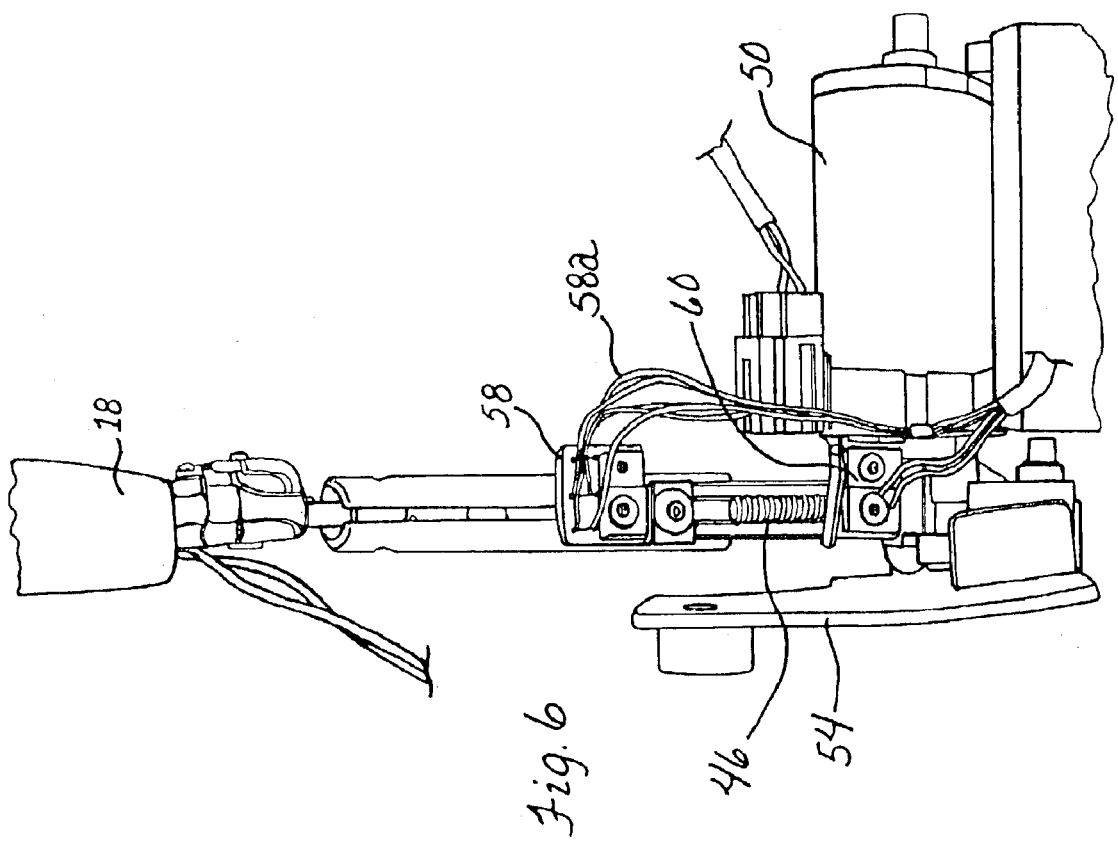

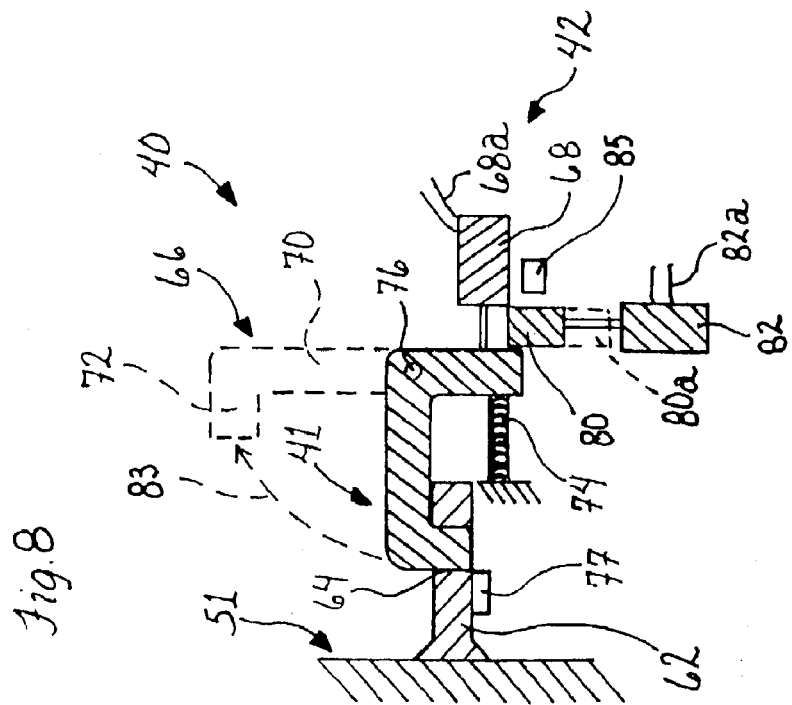
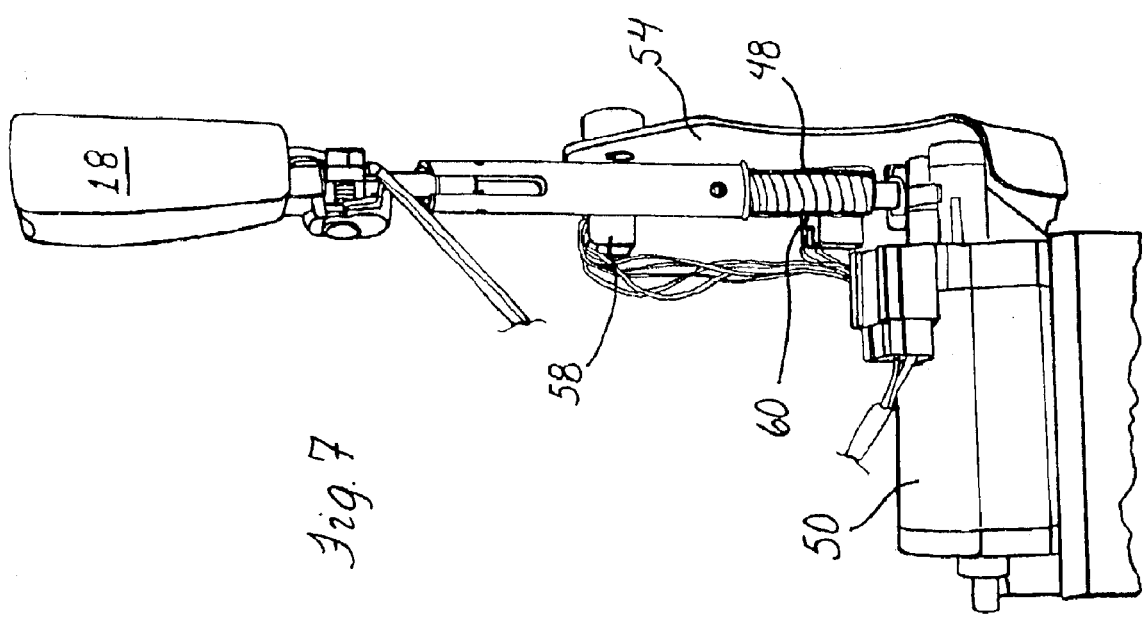

METHOD OF AND AN APPARATUS FOR PRESENTING A SEAT BELT BUCKLE

CROSS REFERENCE TO RELATED APPLICATION

This is a continuation of prior application number PCT/US01/41509, filed Aug. 1, 2001, which is based upon and claims the benefit under 35 U.S.C. §119 of prior provisional application No. 60/222,062, filed Aug. 1, 2000.

FIELD OF THE INVENTION

This invention relates to a seat belt system for vehicles having a seat belt buckle that is to be latched to a tongue plate or tip.

BACKGROUND OF THE INVENTION

Many of the current seat belt systems have the seat belt buckle anchored or secured to the vehicle at a location close to the floor of the vehicle. The various configurations of vehicle bodies often results in the buckle being positioned at a location or in a bight between adjacent seats or vehicle trim or the like that is readily usable by the vast majority of passengers in the vehicle. However, some vehicle passengers such as the elderly who are no longer very agile, who are very large and heavy persons, or who are handicapped persons experience difficulty in latching the seat belt buckle and tip together.

There is a reluctance to raise or otherwise change the location of the seat belt buckle because this affects the performance of the seat belt system as a whole. For example, if the buckle were raised six inches higher, this affects the angles or positions of the shoulder and lap portions on the passenger's body. Thus, for better or optimum performance of the seat belt system, it is desired to retain the latched seat belt at the desired optimal performance location. On the other hand, there is a need, at least in some instances, to position the seat belt buckle for easier use without affecting its optimal performance at the time of a vehicle collision or fast deceleration. Such a need should encourage seat belt usage by those who have experienced difficulty in latching the buckle and tip.

SUMMARY OF THE INVENTION

In accordance with the present invention, there is provided a buckle presenter system that shifts the buckle to a more accessible latching position for latching with a tongue plate or tip and then shifts the latched buckle to a performance position for achieving the desired performance. This is achieved by sensing the occupant's need for latching the buckle as when the occupant enters the vehicle and is seated and then automatically shifting the buckle to a latching position for providing better accessibility for inserting the latch plate into the buckle and then automatically returning the latched buckle to the performance position.

In the illustrated embodiment of the invention, the seat buckle is raised to the latching position and remains there for a reasonable period of time, as determined by a timing mechanism which then causes the operation of a motorized drive to return the latched buckle and tip to the retracted optimal performance position, which is below that of the latching position. Also, in the illustrated embodiment of the invention, the motorized drive will raise the seat belt buckle from the optimal performance position automatically after sensors sense that the vehicle door has been opened and closed signifying that a vehicle occupant probably has entered the vehicle and is seated. The automatic raising of the buckle should draw the attention of the occupant to the need for latching the seat belt buckle as well as presenting it at a more comfortable position for latching.

It will be appreciated that the buckle is often anchored or tied to the vehicle frame to provide a very strong and secure anchorage without play or looseness, whereas the drive mechanism to shift the buckle may have looseness therein or lack sufficient strength to withstand and exceed the federal regulations or vehicle manufacturer standards for a seat belt system. In accordance with the present invention, it is preferred to provide a locking or securing mechanism that secures the latched buckle herein against shifting and adds strength and stability to the anchorage of the latched buckle to the vehicle.

Diagnostic circuitry can be provided which is operable to generate a signal to a vehicle occupant should the locking mechanism fail, such as by failing to properly engage when the buckle is shifted to the performance position. The diagnostic circuitry is connected to the instrument panel warning system so that when the locking mechanism fails, a light on the panel is activated to alert the vehicle occupants that there is a problem with the presenter system that needs to be addressed. That is, if the warning light is on, the locking mechanism has failed to properly engage signifying an unsafe condition in the system to be fixed. In this regard, there can be provided a sensor that detects whether the locking mechanism properly engages to secure the latched buckle in its performance position. When not properly engaged, the sensor via the diagnostic circuitry signals the light indicator to turn on to warn the vehicle occupants that the locking mechanism has failed.

The illustrated apparatus comprises a door switch to sense the opening and closing of the vehicle door and to signal an electrical control system to operate a motorized drive to shift the buckle to the latching position. Preferably, a sensor such as a switch senses arrival of the buckle at the latching position, which, for example, may be six inches of travel most of which is upwardly from the performance position to the latching position, and causes initiation of a timing period for the person to do the latching of the buckle to the tip. Upon timing out, the timing mechanism initiates operation of the motorized drive to return the latched buckle and tip to the performance position and a sensor such as a switch senses the arrival of the latched buckle at the performance position. In the illustrated embodiment of the invention, a controller or computer receives the signals from the various sensor switches and causes operation of and termination of the motorized drive for shifting the buckle and operation of a locking or anchoring mechanism to secure the latched buckle at the performance position.

BRIEF DESCRIPTION OF THE DRAWINGS

FIG. 1A is a diagrammatic view of a seat belt system having a buckle presenter system;

FIG. 1B is a diagrammatic view of a buckle movable between an upper latching position and a lower performance position with the system illustrated in FIG. 1;

FIG. 1C is a partial front elevational view of a vehicle door operating a sensor switch with opening and closing of the door;

FIG. 2 is a partial front elevational view of a motor-driven carrier system for the buckle;

FIG. 5 is a right-side elevational view of the system shown in FIG. 3 and looking from the side opposite that shown in FIG. 4;

FIG. 6 is another front elevational view of the buckle presenter system;

FIG. 7 is a rear elevational view of the buckle presenter system; and

FIG. 8 is a diagrammatic view of a locking system for locking the latched buckle and tip in the performance position.

DETAILED DESCRIPTION OF THE PREFERRED EMBODIMENT

Figure 1:
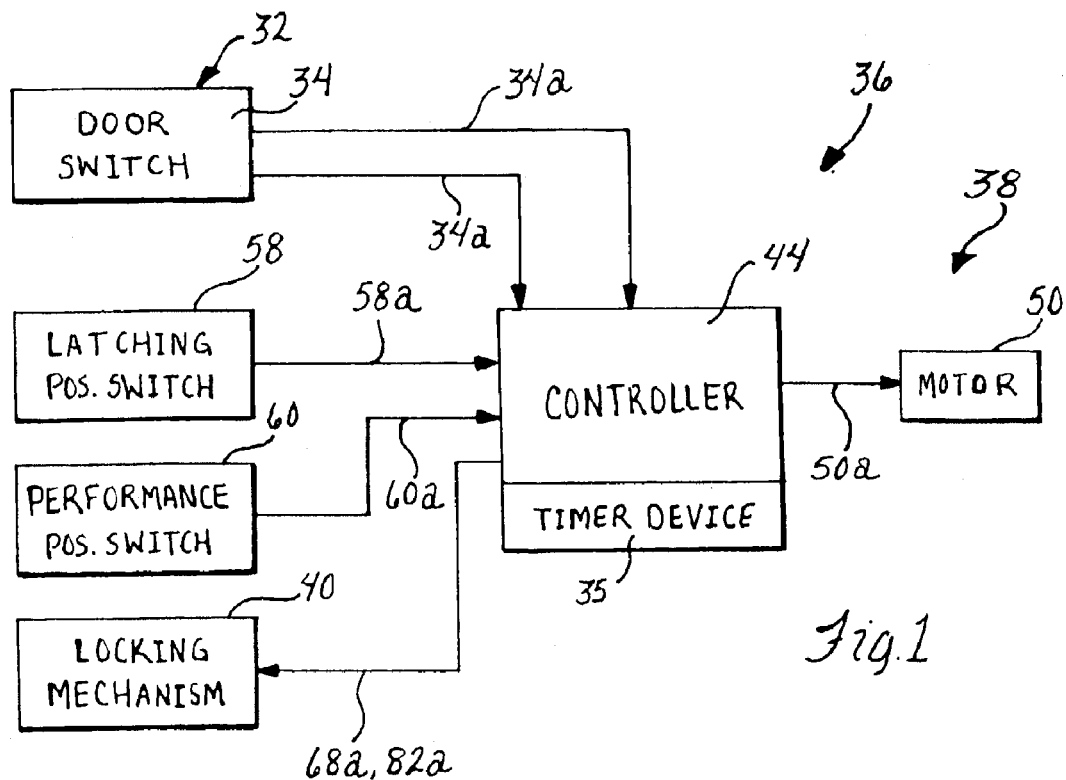
FIG. 1 is a block diagram of the buckle presenter system constructed in accordance with an embodiment of the invention.

As shown in the drawings for purposes of illustration, a seat belt system 10 is shown having a seat belt 12 that extends from a retractor 14 from which seat belt is wound and unwound. The seat belt system 10 herein is not limited to any particular configuration in terms of its mounting in a vehicle. As such, the system 10 can be integrated into the seat with the retractor 14 mounted therein. In the illustrated form, the belt 12 runs to a turning loop 15, which is secured to a vehicle pillar (not shown) and the belt carries a slidable tongue plate or tip 16 to be latched to a seat belt buckle 18. The buckle is secured to an anchor or anchorage system 20 that, in turn, is anchored to the vehicle floor. As mentioned, the seat belt system, diagrammatically illustrated in FIG. 1A is merely illustrative of one of many different seat belt configurations, e.g., the retractor may be mounted on the seat back 22 and the strap may extend therefrom down along the occupant's shoulder and chest to a side of a vehicle seat 24. Often the seat belt buckle is mounted at a side of the vehicle seat and the occupant must slide the tip 16 along the belt down to a position lower than the top of the seat cushion on which the person is seated.

This location of the seat belt buckle 18 is inconvenient for some people, particularly those who are very large and heavy, handicapped, or elderly. Thus, there is a need to provide a buckle presenter system to present the buckle to the seated occupant without interfering with the performance of the seat belt system with the buckle in its usual position which has been selected for best or optimum performance.

In accordance with the present invention, there is provided a buckle presenter system 25 which shifts the buckle 18 to a more accessible latching position 28, which is shown as a raised position in dotted lines diagrammatically in FIG. 1B for latching with the tip 16 and then shifts the latched buckle and tip to a performance position 30 for achieving the desired performance. Herein, the performance position is a lowered position, e.g., six inches lower than the upper latching position 28. In the illustrated embodiment of the invention, the shifting movement is substantially vertical but for other seat belt systems the shifting movement may have a substantially greater horizontal component of displacement. The buckle 18 is shifted automatically to the latching position 28 and stops for the latching operation of the tip 16 to the buckle 18, and then the latched buckle 18 and tip 16 are automatically returned to the performance position 30. That is, it is preferred to sense the occupant's need for latching the seat belt as when the occupant opens and closes a vehicle door 32 and is seated on the vehicle seat 24. Herein, a sensor 33 (FIG. 1C) in the form of a micro-switch 34 is mounted on the vehicle adjacent the door 32 to have its switch contacts (not shown) shift to a first position as the door is opened and then shift to a second position as the door is closed. Two separate switches could be used, one for sensing the opening of the door and the other for sensing the closing of the door. Herein, it is preferred to cause the automatic operation of shifting the buckle 18 from its stored, performance position 30 to the latching position 28 and to return the same each time the door is opened and closed. Manifestly, a sensor in the seat could be provided along with the door sensor to assure that a person is actually seated before the buckle is shifted to the latching position.

In accordance with the preferred and illustrated embodiment of the invention, the seat belt buckle 18 is located at the latching portion 28 for a predetermined interval of time, e.g., 10 to 15 seconds and then the buckle 18 is returned automatically to the optimal performance position 30. This is achieved by having a timer device 35 (FIG. 1) time out the interval for latching and then causing the electrical control system 36 to operate a motorized drive 38 to lower the buckle 18 to the lower position 30. If for some reason the seated occupant is prevented from buckling before the buckle 18 is returned, the occupant can either latch the tip 16 to the buckle 18 which will be at the position it would be, if no buckle presenter system were available, or the occupant can again open and close the door.

The predetermined time interval during which the buckle is in the latching position can be tailored to the design or platform of the particular vehicle model into which it is to be installed. Accordingly, an original equipment manufacturer or the vehicle manufacturer themselves can calibrate the timer device for adjusting the time out period in which the buckle remains at the latching position to better meet the requirements of the layout of different types of vehicles including the seat belt systems thereof.

It will be appreciated that the anchorage system 20 that anchors the buckle to the vehicle frame or floor is a very strong anchor that must meet federal and vehicle manufacturer's standards. To assure that the motorized drive 38 does not interfere or detract from meeting such standards, it is preferred to provide a locking or anchor securing mechanism 40 that locks or anchors the buckle 18 upon its return to add strength and stability to the anchorage system 20 for the seat belt system having a motorized drive mechanism 38 for shifting the buckle. In this instance, the locking mechanism 40 comprises an electrically operated securing device 42 operated by a controller 44 as well as a mechanical backup or fail-safe securing device.

Referring now in greater detail to the illustrated embodiment of the invention, the seat belt buckle 18 is mounted on the motorized drive 38 that comprises a vertical drive screw 46 having a thread 48 which is rotated within a vertical, stationary housing 49 by an electric motor 50 that is operable in reverse directions of rotation, either to raise or lower the buckle 18. A worm gear (not shown) between the motor 50 and vertical drive screw 46 rotates the latter as the motor 50 turns its output shaft carrying the worm gear.

Figure 4:
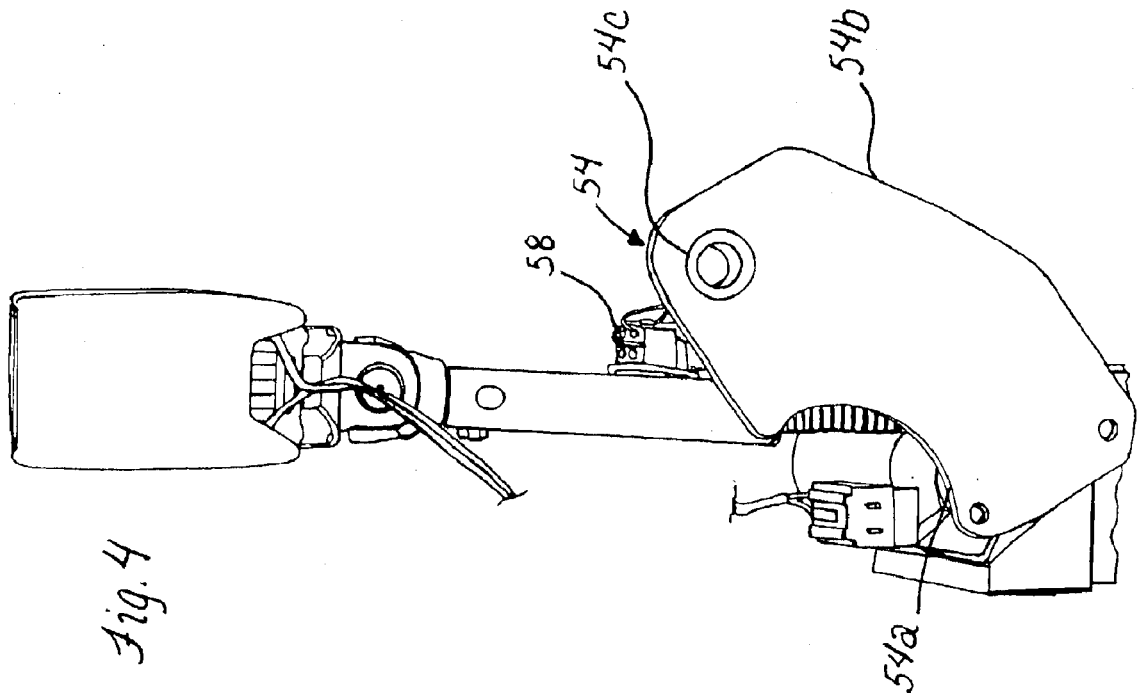
FIG. 4 is a left-side elevational view of the buckle presenter system as shown in FIG. 3.
Figure 3:
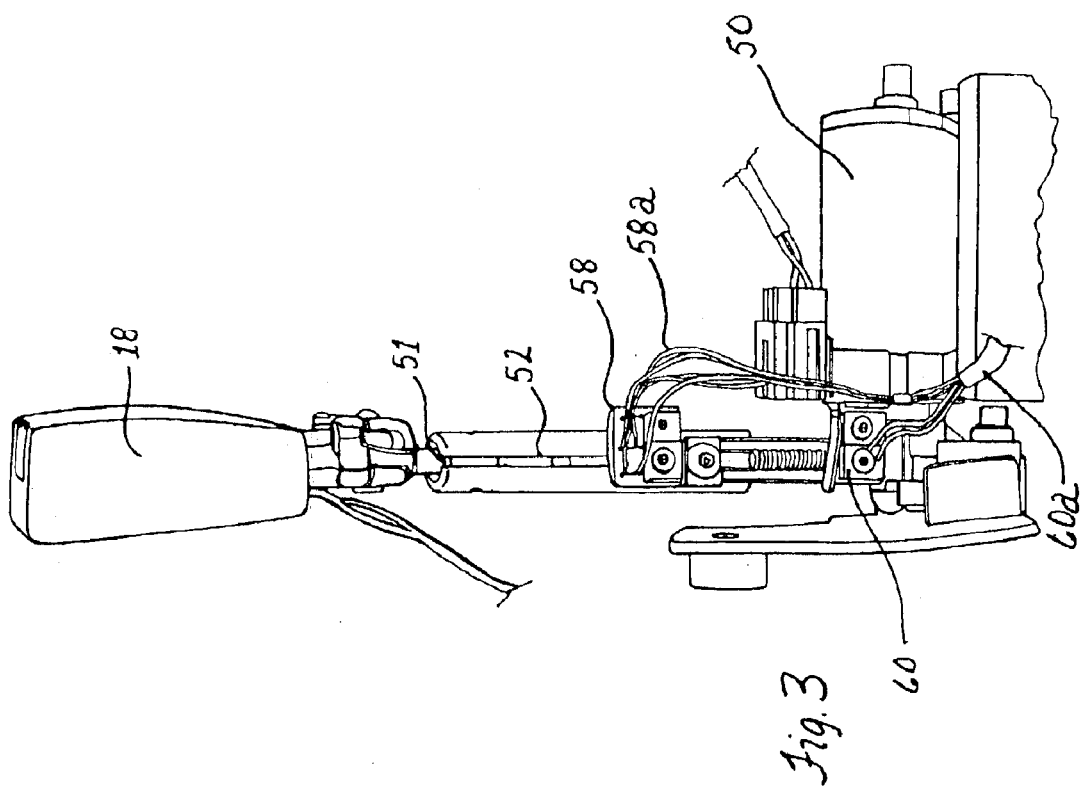
FIG. 3 is a front elevational view of the system of FIG. 2.

The buckle 18 is secured to a carriage having a nut mounted on the drive screw 46 with the nut having a portion 51 that slides rectilinearly in a vertical guide slot 52 in housing 53 of the anchoring system. The anchoring system, in this instance, includes a large vertically extending, flat anchor plate 54 (FIG. 4) of arcuate shape having a smaller arcuate edge 54a, a larger arcuate edge 54b, and a projecting boss 54c. Manifestly, the anchoring plate 54 will be of different shapes and/or designs for different vehicles. The lower end of the vertical stationary housing 49 is secured to the lower end of the anchor plate 54 by a bracket 56 that extends laterally between the lower plate end and the lower end of the vertical housing 49.

The preferred sensor for sensing the travel and arrival of the buckle 18 at its performance and latching positions comprises an upper limit switch 58 for sensing the buckle being at the upper latching position and a lower limit switch 60 for sensing the buckle being at the lower latching position. Upper leads 58a extend from the upper limit switch to the controller 44 and lower leads 60a extend from the lower limit switch to the controller 44 to deliver signals with respect to presence or absence of the buckle from the respective latching and performance positions.

In the illustrated embodiment of the invention, the locking or securing mechanism 40 (FIG. 8) locks the latched buckle 18 and tip 16 in the performance position. The mechanism 40 serves to positively block travel of the buckle 18 as it resides in the performance position 30 after the door has been opened and timer device has timed out, and can be implemented in a variety of ways. The mechanism 40 will generally include an abutment or stop 41 that is operable to prevent travel of the carriage 51 along the drive screw 46 once the buckle 18 has reached the performance position thereof.

Preferably, there is provided a mechanically operated, securing device (not shown) as well as the electrically operated securing device 42, which is diagrammatically illustrated in FIG. 8. The slidable carriage 51 carrying the buckle for sliding vertically is provided with a laterally extending bracket 62 having an aperture 64 to receive a locking member 66 that is shifted between the solid line locking position and the dotted line release position allowing the carriage 51 to move upwardly to the latching position. Herein, the locking member is shifted to the unlocking position by a solenoid 68 having a pair of leads 68 a extending to the controller 44. The illustrated locking member 66 is in the form of a pivoted locking lever or dog 70 having a hook 72 for insertion into the bracket 62. A high force compression spring 74 pushes against one end of the locking lever to pivot the lever about a pivot pin 76 to push the locking lever to the locking position which is shown in dotted lines. A sensor 77 detects whether the lock dog 70 has properly engaged with bracket aperture 64. A relatively positionable block 80 is movable vertically from the solid line position shown in FIG. 8 to a non-blocking lower position 80a which is shown in dotted lines. The block 80 is shifted between the blocking position and the non-blocking position by a solenoid 82 having leads 82a extending to the controller 44 for selective operation of the blocking solenoid. In the blocking position, the dog 70 is tightly held from pivoting out of the engaged, locked position between the high force spring 74 and block 80. In the blocking position, the block 80 prevents the dog 70 from pivoting to the unlocked position along arrow 83. A sensor 85 can be provided to detect if the block is properly shifted to its blocking position. Various other locking or securing mechanisms may be used to secure the latched buckle and tip in the performance position to assure that they are securely held to meet the governmental and manufacturer standards.

The sensors 77 and 85 act as checks to determine whether the buckle is locked in its performance position. The sensors 77 and 85 can be connected to a diagnostic module including circuitry that is in communication with the controller 44. The controller 44 can initiate the diagnostic operation by indicating to the circuitry that the locking mechanism 40 has been activated. At this time, the circuitry checks the input from sensors 77 and 85 to make sure both signal that the associated locking devices have properly shifted to their locking or blocking positions. If one or both of the sensors 77 and 85 signal that this has not occurred, the diagnostic circuitry will go into a failure mode. At this point, the diagnostic circuitry will cause an indicator in the form of an instrument panel light to activate to provide a visual warning to the vehicle occupant that there has been malfunction of the presenter system 25. Alternatively, the controller 44 can monitor the diagnostic circuitry mode and be connected to the instrument panel warning system to control activation of the panel light. It is also possible that the diagnostic circuitry for the present system 25 can be incorporated into that for the controller 44 so that a separate diagnostic module for the buckle presenter system is not needed. Other implementations of the electrical control system such as that, for example, illustrated in FIGS. 1 and 2 will be apparent to those skilled in the art and fall within the purview of the present invention. For instance, there can be different numbers and types of sensors that indicate whether the locking mechanism is properly engaged, particularly where different types of locking mechanisms then described herein are employed. Further the diagnostic circuitry can also receive input from the lower limit switch 60 as to whether the buckle has properly returned to its performance position for operation of the panel light, although it is noted that this will likely be redundant for if the buckle is not properly in the performance position, there will likely also be a failure of the locking mechanism 40 in properly engaging in its locked or blocked position.

Figure 1D:
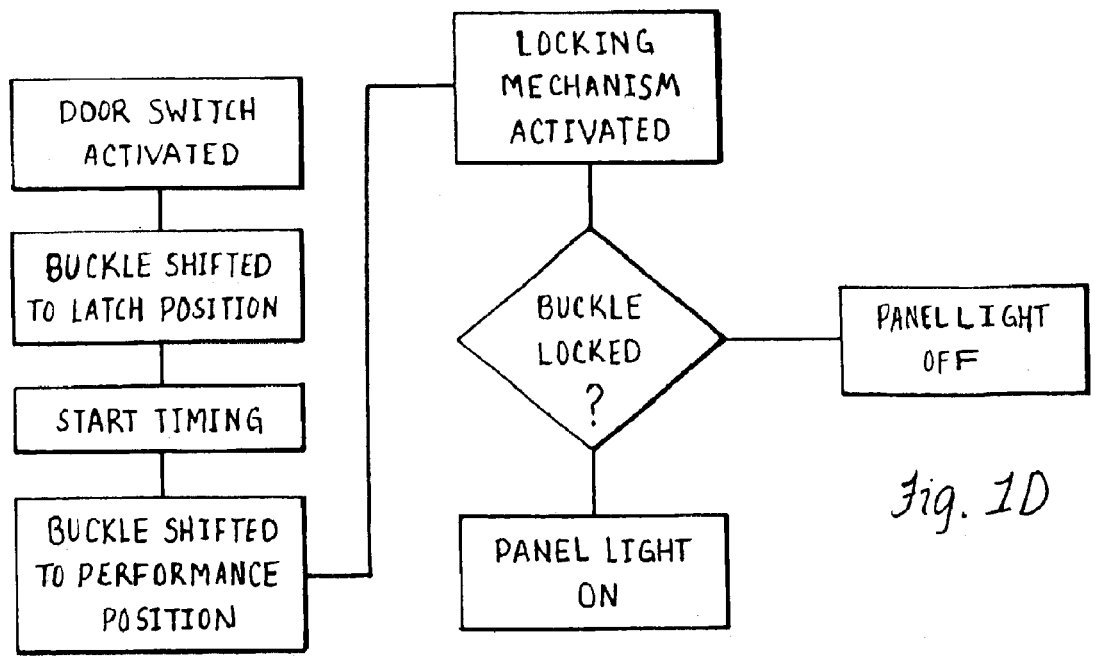
FIG. 1D is a flow chart of the operation of the presenter system showing the diagnostic steps for detecting proper locking of the buckle in the performance position.

As an aid to understanding the invention, a brief review of the operation of the illustrated buckle presenter system 25 will next be described. Referring to FIG. 1D, a preferred electrical control system is illustrated in FIGS. 1 and 2 which has the controller 44 as a part thereof, and the electrical control system operates such that when a person such as a vehicle driver opens the vehicle door 31 (FIG. 1c), the door sensor switch 34 is operated, and when the door is closed by the seated passenger the door sensor switch 34 is again operated. In the illustrated control system, successive switch operations are inputted as signals over leads 34a to the controller 44 (FIG. 1) of the electrical control system. The controller 44 operates the solenoids 68 and 82 (FIG. 8) to shift them to unlock the buckle carriage 51 for travel. The controller then operates the electric motor 50 to turn its output shaft to rotate the vertical screw 46 in a direction to translate a nut on the buckle carriage 51 upwardly to raise the buckle 18 for about six inches in this instance. The carriage engages and actuates the upper limit switch 58 when the buckle 18 reaches the upper, latching position 28 at which the seated passenger may more easily latch the tip 16 to the buckle 18. The buckle remains at the latching position for a predetermined time, e.g., 15 seconds as timed by a timer device 35. At the end of the timing period, the controller operates the motor 50 to turn the drive screw 46 in the opposite direction to lower the carriage which travels downwardly for six inches to operate the lower limit switch 60 having leads 60a extending to the controller which then shuts off the motor 50 and operates the locking mechanism 40 (FIG. 8) to lock the latched buckle 18 and tip 16 in the performance position 30. The controller 44 operates the locking mechanism shown in FIG. 8 by de-energizing the solenoid 68 to allow the spring 74 to pivot the hook end 64 of the locking lever 70 into the aperture 64 in the bracket 62 on the buckle carriage 51. The controller 44 then energizes the blocking solenoid 82 to raise the block 80 into position to block turning of the locking lever 70 such as at the time of an accident. The diagnostic circuitry is operable to control operation of a warning light if the system 25 malfunctions based on input from check sensors 77 and 85. When the passenger unbuckles the buckle from the tip, both of which are at the latching position, the buckle remains locked at the latching position while the tip and its belt are shifted by the retractor to their stored position.

From the foregoing, it will be seen that there is provided a buckle presenter mechanism that facilitates the use of the seat belt system by presenting the buckle automatically to the person using the same and then automatically shifting the buckle to the performance position. Manifestly, the buckle could be positioned in the latching position awaiting a passenger to open and close the vehicle door and rather than positioned in the performance position. Also, seat sensor switches could be used in connection with systems to avoid operation of the system when a person opens and closes the door to retrieve something from the vehicle without being seated therein. Also, a switch in the buckle could be used rather than the timer to cause the shifting of the latched buckle and tip from the latching position to the performance position. The performance position of the buckle could also be at a variety of different locations relative to the seated occupant and which are otherwise not optional for ease of latching.

Manifestly, other embodiments of the invention may be used than those illustrated and described herein.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A seat belt system for shifting a buckle to an upper latching position with a tip and for returning the latched buckle and tip to a performance position, the buckle presenter system comprising:
    a seat belt for positioning across a chest and a lap for a passenger seated on a seat of a vehicle;
    a tip carried on the seat belt for latching with a buckle;
    a buckle for latching with the tip;
    a drive mechanism for shifting the buckle along a substantially vertical upward path of travel relative to the seat from the performance position where the buckle is located for enhanced performance to the upper latching position for latching with the tip;
    the drive mechanism lowering the latched tip and buckle from the latching position to the performance position; and
    a timing device for timing the time for the buckle to be at the latching position to allow latching of the buckle to the tongue plate and then causing the drive mechanism to return the buckle to the performance position.

2. A buckle presenter system in accordance with claim 1 comprising:
    a locking mechanism for locking the buckle and tip at the performance position to resist loads applied thereto at the time of an emergency usage of the system belt system.

3. A buckle presenter system in accordance with claim 2 comprising:
    diagnostic circuitry including a sensor for detecting proper locking of the buckle at the performance position by the locking mechanism and activating a warning indicator if proper locking has not occurred.

4. A buckle presenter system in accordance with claim 1 comprising:
    an electrical control system for operating the drive mechanism to shift between its latching and performance positions.

5. A buckle presenter system in accordance with claim 4 comprising:
    a sensor for sensing that a seat occupant is in the seat and ready for latching the buckle to the tongue plate.

6. A buckle presenter system in accordance with claim 5 wherein:
    the sensor comprises a door switch for sensing the opening and closing of a vehicle door used by the occupant.

7. A buckle presenter system in accordance with claim 6 wherein the electrical control system comprises:
    a controller receiving signal inputs from the door switch and the timer to cause operation of the drive mechanism to shift the buckle between the performance and latching positions.

8. A buckle presenter system in accordance with claim 7 comprising:
    a buckle position sensor for sensing the position of the buckle at its latching and performance positions.

9. A buckle presenter system in accordance with claim 8 wherein the buckle position sensor comprises:
    a switch operated by the buckle when it is at the latching position; and
    a switch operated by the buckle when it is at the performance position.

10. A buckle presenter system in accordance with claim 1 wherein the drive mechanism comprises:
    a motor; and
    a buckle carrier moved by the motor along the predetermined path between the latching and the performance positions.

11. A buckle presenter system in accordance with claim 10 wherein the buckle carrier comprises:
    an elongated screw thread rotatable by the motor and extending between the latching position and the performance position; and
    a carrier carrying the buckle and having threaded engagement with the screw thread and translating along the screw thread as it is turned by the motor.

12. A buckle presenter in accordance with claim 1 comprising:
    an anchor for a vehicle floor adjacent the seat with the latched tip and buckle transmitting a restraining force directly from the belt to the anchor at the vehicle floor.

13. A buckle presenter system in accordance with claim 12 comprising:
    a vertical guide extending vertically adjacent a side of the seat for guiding the buckle for rectilinear vertical travel between the lower performance position and the upper latching position.

14. A buckle presenter system for presenting a buckle to a seated occupant at a latching position for latching to a tip and for shifting the latched buckle and tip to a performance position; the system comprising:
    a buckle for latching to a tip at the latching position;
    sensors for sensing the opening and closing of a door by the occupant;
    a motor driven carrier for carrying the buckle substantially vertically in an upward direction to the latching position and for carrying the latched tip and buckle substantially vertically in a downward direction to the performance position;

an electrical control system operable by signals from the sensor to operate the motor driven carrier to shift the buckle to the latching position and, after latching to a tip, to shift the latched tip and buckle to the performance position; and a locking mechanism operable by the controller to lock the latched tip, buckle and buckle carrier at the performance position.

15. A buckle presenter system in accordance with claim 14 wherein the sensors comprise at least one door switch operable by the door opening and closing to send signals to the controller to begin the shifting of the buckle to the latching position.

16. A buckle presenter system in accordance with claim 15 comprising:

a switch operable with the buckle in the latching position to signal the controller that the buckle is in the latching position;

a timer associated with the controller operable by the switch to time out a period for a latching operation; and a switch operable with the buckle in the performance position to signal the controller that the latched buckle is in the performance position.

17. A buckle presenter system in accordance with claim 16 comprising:

diagnostic circuitry including a sensor for detecting proper locking of the buckle at the performance position by the locking mechanism and activating a warning indicator if proper locking has not occurred.

18. A buckle presenter system in accordance with claim 14 wherein the motor driven carrier comprises:

a motor operable by the controller; and a rotatable screw drive driven by the motor and connected to the buckle to shift the buckle between the latching and the performance positions.

19. A buckle presenter in accordance with claim 14 comprising:

an anchor for being secured to a vehicle floor adjacent the seat and connected to the latched tip and buckle to transmit belt restraining forces to the vehicle floor at a location adjacent the seat.

20. A buckle presenter system in accordance with claim 19 wherein the vertical guide extends vertically to guide the buckle for about six inches of vertical rectilinear travel.

21. A method of presenting a seat belt buckle in a seat belt system to a vehicle occupant and for returning the buckle to a performance position, the method comprising:

sensing the opening and closing of a vehicle door signifying the entry of an occupant for seating in a vehicle seat;

shifting substantially vertically upward the seat belt buckle stationarily anchored at one end to the floor or frame of the vehicle from a performance position to a latching position for easier latching by the seated occupant;

latching of the buckle to a tip at the latching position; and lowering the latched buckle and tip alone a substantially vertical downward oath of travel to the performance position.

22. A buckle presenting method in accordance with claim 21 comprising:

securing the latched buckles at the performance position to the vehicle to withstand predetermined loads on the buckle.

23. A buckle presenting method in accordance with claim 21 comprising:

timing out a period for latching of the buckle and tip and returning the latched buckle after the timing period.

24. A method in accordance with claim 21 comprising:

sensing the buckle being at the latching position; and sensing the buckle being at the performance position.

25. A seat belt system having a buckle presenter for raising a buckle anchored to a vehicle floor or frame to an upper latching position for attachment to a tip and for lowering the buckle to a performance position, the buckle presenter comprising:

a seat belt for positioning across a chest and a lap of a passenger on a seat in a vehicle;

a tip carried on the belt;

a seat belt buckle adapted to latch with the tip;

an anchor for being secured to a vehicle floor at a location adjacent the seat;

the anchor transmitting belt restraining forces from the latched tip and buckle to the floor at a location adjacent the seat;

a drive mechanism for shifting the buckle substantially vertically to raise the buckle above a seat cushion on which the passenger is seated to facilitate a latching of the tip on the belt to the seat belt buckle;

the drive mechanism shifting the latched tip and the buckle downwardly to the performance position; and an electrical control system for operating the drive mechanism to raise the buckle above the seat cushion for latching to the tip and for operating the drive mechanism to lower the latch plate and buckle to its performance position.

* * * * *

UNITED STATES PATENT AND TRADEMARK OFFICE
CERTIFICATE OF CORRECTION

PATENT NO. : 6,883,834 B2
DATED : April 26, 2005
INVENTOR(S) : Richard M. Grabowski et al.

It is certified that error appears in the above-identified patent and that said Letters Patent is hereby corrected as shown below:

Column 10,
Line 10, change "alone" to -- along --.
Line 11, change "oath" to -- path --.

Signed and Sealed this

Nineteenth Day of July, 2005

JON W. DUDAS
*Director of the United States Patent and Trademark Office*